(12) United States Patent
Mack

(10) Patent No.: US 9,050,660 B2
(45) Date of Patent: Jun. 9, 2015

(54) DRILL

(75) Inventor: Hans-Dieter Mack, Sontheim (DE)

(73) Assignee: ROEHM GMBH, Sontheim (DE)

( * ) Notice: Subject to any disclaimer, the term of this patent is extended or adjusted under 35 U.S.C. 154(b) by 651 days.

(21) Appl. No.: 13/320,037

(22) PCT Filed: Jun. 11, 2010

(86) PCT No.: PCT/DE2010/075050
§ 371 (c)(1),
(2), (4) Date: Mar. 4, 2012

(87) PCT Pub. No.: WO2011/000370
PCT Pub. Date: Jan. 6, 2011

(65) Prior Publication Data
US 2012/0175849 A1   Jul. 12, 2012

(30) Foreign Application Priority Data

Jun. 30, 2009 (DE) .................. 10 2009 026 075

(51) Int. Cl.
*B23B 31/173* (2006.01)
*B23B 31/12* (2006.01)

(52) U.S. Cl.
CPC ..... *B23B 31/1253* (2013.01); *Y10T 279/17615* (2015.01); *Y10T 279/27* (2015.01); *Y10S 279/902* (2013.01); *Y10T 408/65* (2015.01); *Y10T 279/3451* (2015.01); *B23B 31/123* (2013.01); *B23B 2231/06* (2013.01)

(58) Field of Classification Search
CPC ............... B23B 31/102; B23B 31/123; B23B 31/16045; B23B 2231/06
USPC ............... 279/902, 150, 147, 134, 60, 61, 62; 408/124, 238, 239 R
See application file for complete search history.

(56) References Cited

U.S. PATENT DOCUMENTS

| 3,244,428 A * | 4/1966 | Rohm ............................ 279/60 |
| 4,317,578 A | 3/1982 | Welch |
| 7,588,398 B2 | 9/2009 | Puzio |
| 7,588,399 B2 | 9/2009 | Puzio |
| 7,690,658 B2 | 4/2010 | Puzio et al. |
| 7,806,636 B2 * | 10/2010 | Puzio ............................ 408/124 |
| 8,403,339 B2 * | 3/2013 | Yaksich ......................... 279/60 |
| 2006/0202435 A1 | 9/2006 | Rohm |
| 2007/0132196 A1 * | 6/2007 | Puzio et al. .................. 279/2.21 |
| 2008/0185794 A1 | 8/2008 | Puzio |

FOREIGN PATENT DOCUMENTS

DE         4304251 A1 *  8/1994

* cited by examiner

*Primary Examiner* — Eric A Gates
*Assistant Examiner* — Chwen-Wei Su
(74) *Attorney, Agent, or Firm* — Andrew Wilford

(57) ABSTRACT

The invention relates to a drilling device comprising a drilling machine (2), which has a drilling spindle (5) that is rotatably supported in a machine housing (4), and a drilling chuck (3), which has a chuck body (6), a clamping cone (7) that can be rotated coaxially to the chuck body (6), and a jaw holder (8), in which clamping jaws (10) are guided in guiding receptacles (9), which clamping jaws are supported on a carrier (11) so as to be radially movable, the threaded section (12) of which carrier engages in a threaded socket (13) that is associated with the chuck body (6) and that is coaxial to the chuck axis. The drilling spindle (5) is designed as a hollow spindle, in which a coupling rod (14) that is connected to the threaded socket (13) in a rotationally fixed manner engages, wherein the coupling rod (14) can be moved between a clamping position coupled with the machine housing (4) in a rotationally fixed manner and a drilling position coupled with the drilling spindle (5) in a rotationally fixed manner.

17 Claims, 12 Drawing Sheets

DRILL

CROSS REFERENCE TO RELATED APPLICATIONS

This application is the US-national stage of PCT application PCT/DE2010/075050 filed 11 Jun. 2010, published 6 Jan. 2011 as WO2011/00370, and claiming the priority of German patent application 102009026075.7 itself filed 30 Jun. 2009.

FIELD OF THE INVENTION

The invention relates to a drilling apparatus comprising a power unit having a drill spindle rotationally mounted in a housing, a drill chuck having a chuck body, a tightening sleeve rotatable coaxially relative to the chuck body, and a jaw holder with guides in which can move jaws radially shiftable on a driver that engages coaxially of the chuck axis with a threaded stem into a threaded tube of the chuck body.

BACKGROUND OF THE INVENTION

A drilling apparatus consisting of a power unit and a drill chuck has been known in practice for a long time, where earlier the power unit was exclusively intended for rotating the drill chuck, while opening and closing of the drill chuck had to be carried out by a drill-chuck key. Further technical development then led to drill chucks that could be activated without keys, in which a clamping sleeve could be rotated by hand relative to the chuck body fixed in place on the drill spindle so as not to rotate, in order to clamp a drilling tool between the jaws or to release the clamping effect. Furthermore, there are efforts to further simplify operation of the drill chuck, for which purpose it is proposed in the case of round jaw chucks in DE 10 2005 012 534 [US 2006/0202435] to use a coupling sleeve that is adjustable relative to the drill chuck, which sleeve is arrested by engagement with the housing to prevent rotation with it, and can be connected with the clamping sleeve with force fit, by a coupling device.

OBJECT OF THE INVENTION

The object of the invention is to provide the simplest possible structure for a drilling apparatus as described above in order to allow simplified operation.

SUMMARY OF THE INVENTION

This object is attained in a drilling apparatus as described above in that the drill spindle is tubular, a coupling rod rotationally connected with the threaded tube engages therein, and the coupling rod is movable between a locked position in which it is rotationally coupled with the housing and a drilling position in which it is rotationally coupled with the drill spindle.

This drilling apparatus is characterized in that the drill chuck has a very simple structure that can be produced and assembled cost-effectively because the changes for modification of the drilling apparatus are all in the power unit. However, these alterations are very simple and require very little space, so that integration into an existing housing is possible, in other words no voluminous housing is required for making available the additional function of automatic tightening and release; manual opening and closing of the drill chuck continues to remain possible. Furthermore, it should be noted that self-tightening drill chucks have the tendency to close more tightly during drilling, in other words to clamp the drilling tool more tightly or, when rotating to the left, to loosen the clamp. This undesirable behavior is prevented, in the case of the invention, by coupling the drill spindle with the coupling rod, and thus with the driver, in the drilling position.

For the sake of completeness, it is mentioned here that the locked position has been given its name on the basis of the influence on the tightening state of the tool, in other words, both tightening and release of the tool can take place in the locked position.

It is very particularly preferred, within the scope of the invention, if the coupling rod has a disk on its end axially remote from the threaded tube, which disk lies against the housing in the locked position and against the drill spindle in the drilling position. This coupling disk makes available a greater contact surface in order to be able to make available a reliable rotational connection of the coupling rod with the housing on the one hand and with the drill spindle on the other hand. It has proven to be advantageous in this connection if the coupling disk has spur-gear teeth on at least one of its flat faces, preferably on both flat faces, to interact with complementary gear teeth, so that rotational coupling is generated by complementary interfitting, in this way, to allow ratcheting of the spur gearing by way of the counter-gearing, if a predetermined torque is exceeded, without destruction of the parts involved.

Within the scope of the invention, the possibility furthermore exists that the coupling disk is movable on the coupling rod between the locked position and the drilling position. Therefore there is no compulsory requirement to shift the entire coupling rod within the housing and relative to the threaded tube, because movement of part of the coupling rod, namely the coupling disk, is also sufficient to guarantee alternate interaction with the housing in the locked position or the drill spindle in the drilling position.

In order to increase safety during drilling, a spring that urges the coupling rod toward the drill spindle is provided between the housing and the coupling rod, which spring ensures a torsion-fit connection of the coupling rod with regard to the drill spindle, so that it is guaranteed that the driver rotates together with the drill chuck.

It is furthermore preferred, within the scope of the invention, if a control element for adjusting the coupling rod is provided on the housing, accessible from the outside, where this control element can act on the position of the coupling rod purely mechanically or electrically/magnetically. If the control element is assigned to the drive system of the power-operated power unit, the possibility exists that in the locked position, the control element is provided to influence the speed of rotation of the power unit, in the sense of a limitation.

A simple mechanical structure is characterized in that the coupling rod has a control cam assigned to it, for movement by a control surface configured on the switch. In this connection, it has proven to be advantageous if the control element is configured as a pressure switch, with a spring that sets the push button into the rest position that corresponds to the drilling position, in other words active operation of the push button by the user is necessary in order to set the coupling rod into the locked position. By this design, safe tightening of the drilling tool during drilling is provided by guaranteeing that the drilling position is maintained.

In order to make it unnecessary for the user to act on the push button permanently in the locked position, the possibility exists that a slide is assigned to the pressure switch, for fixing its position in place, once it has been deflected out of its rest position.

It has furthermore proven to be advantageous if an engagement seat is provided on the push button and an engagement pin is provided on the housing, which pin is adjustable by a control pin. In this connection, in order to increase the operational safety, the configuration is such that the control pin is urged toward the engagement seat, by a control spring.

The additional stresses that occur as the result of opening and closing the drill chuck are taken into consideration in that a stabilizing frame is configured in the housing, in the region of the coupling disk and the switch.

In place of the mechanical movement of the coupling rod by the switch/pressure switch, the possibility also exists that the coupling rod [is —word missing in the German] formed from a magnetic material and that an electromagnet that can be activated by the control element [is —word missing in the German] provided in the housing.

The rotational coupling between the coupling rod and the threaded tube can be achieved simply in that the threaded tube has a non-circular opening in its tube bottom that faces the coupling rod, into which opening the coupling rod engages with a corresponding cross-section. Of course, then the possibility also exists that the threaded tube does not surround the coupling rod, but rather the coupling rod surrounds the threaded tube, with a corresponding configuration. As a result of the increased integration of the drill chuck with the power unit in the drilling apparatus, the possibility also exists of configuring the drill spindle in one piece with the chuck body, thereby again resulting in advantages in production and assembly, because fewer parts have to be handled.

BRIEF DESCRIPTION OF THE DRAWING

In the following, the invention will be explained in greater detail with reference to embodiments shown in the drawing. Therein.

SPECIFIC DESCRIPTION OF THE INVENTION

Figure 1:
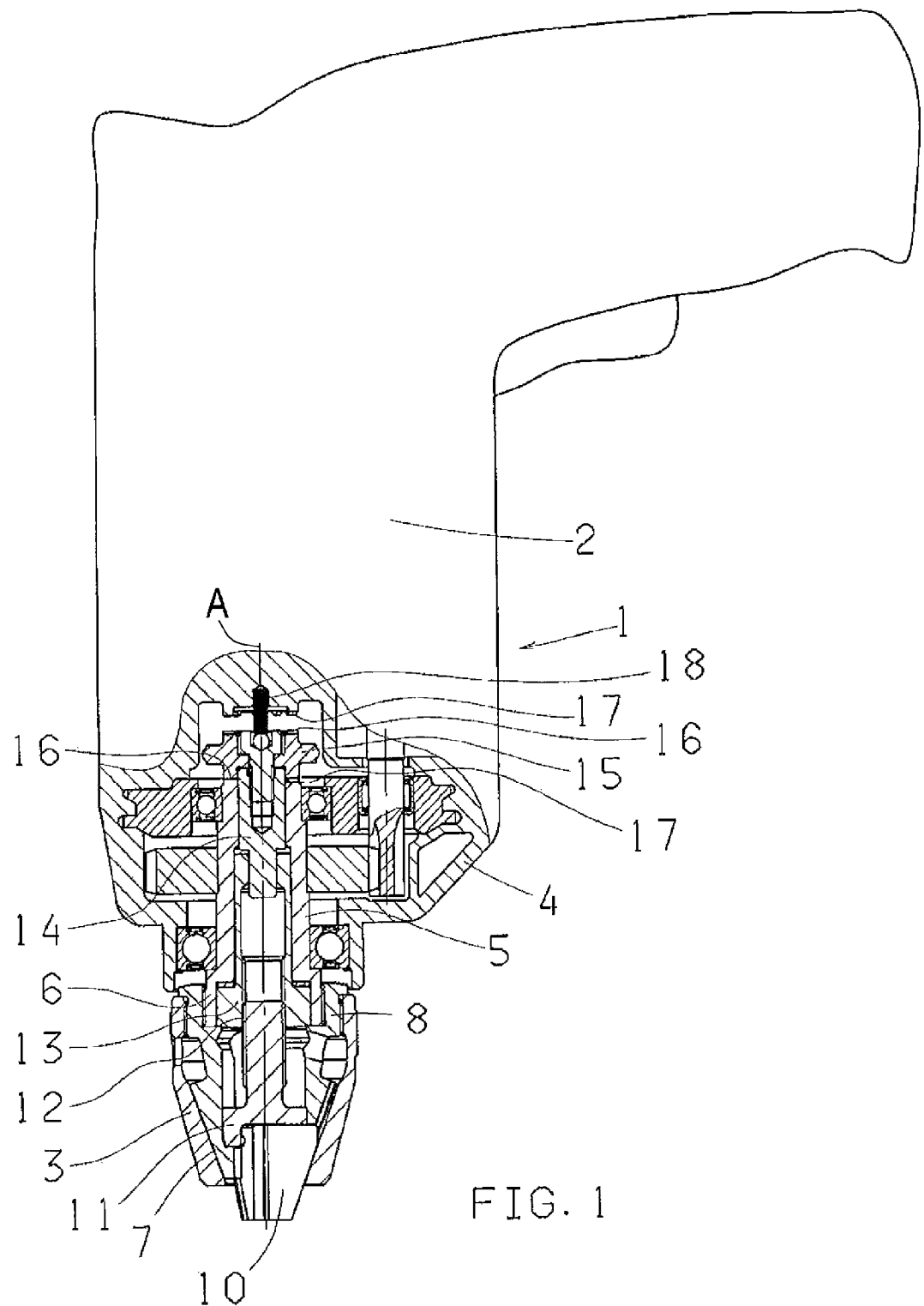
FIG. 1 is a longitudinal section through a drilling apparatus according to the invention.
Figure 2:
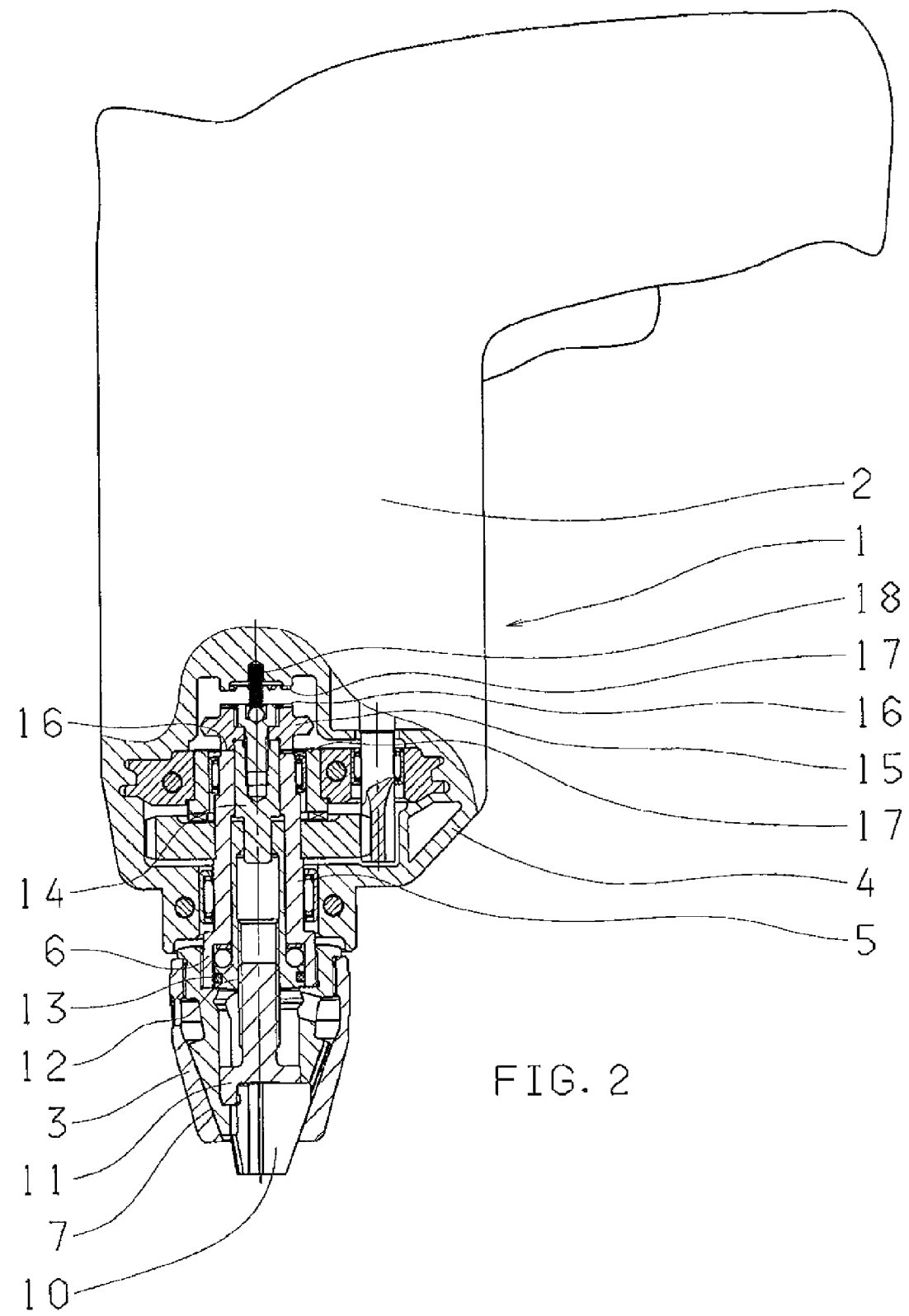
FIG. 2 is a view like to FIG. 1 of an alternative embodiment with modified mounting of the drill spindle.
Figure 3:
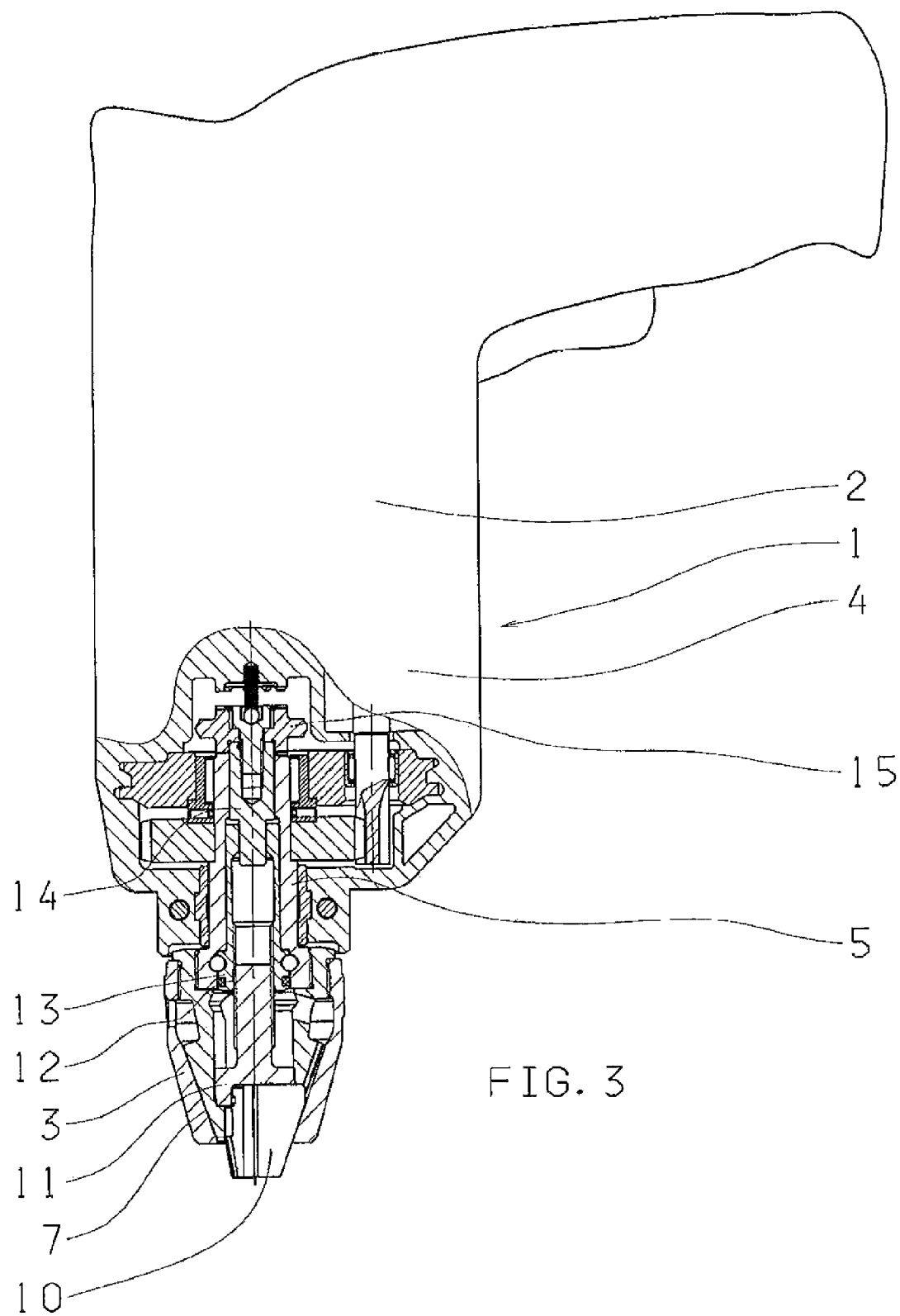
FIG. 3 is a view like FIG. 1 of another different embodiment, with modified spindle mounting.
Figure 11:
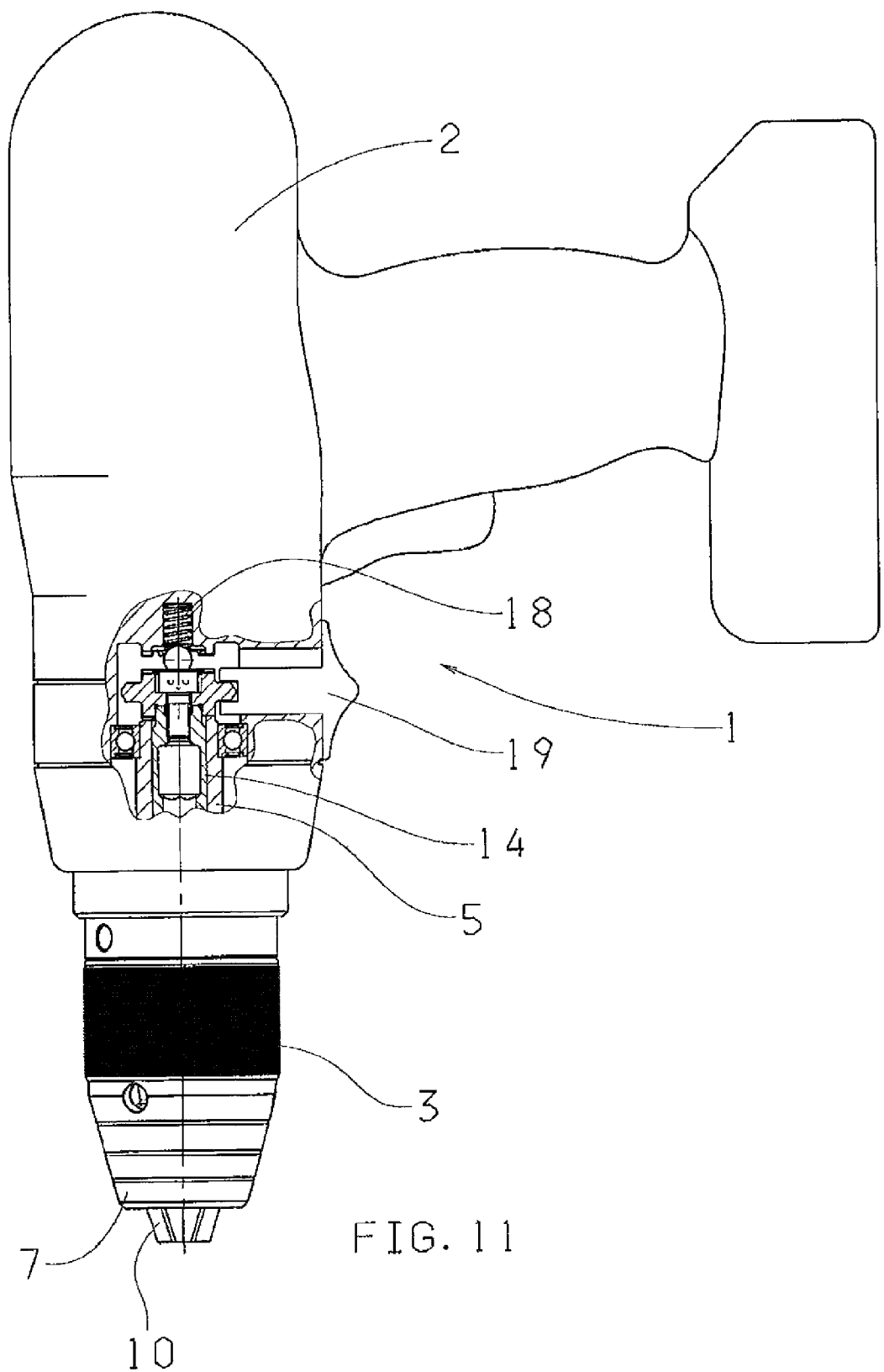
FIG. 11 is a side view of a drilling apparatus according to the invention, in the form of a rechargeable drill/screwdriver, shown partly in section.
Figure 12:
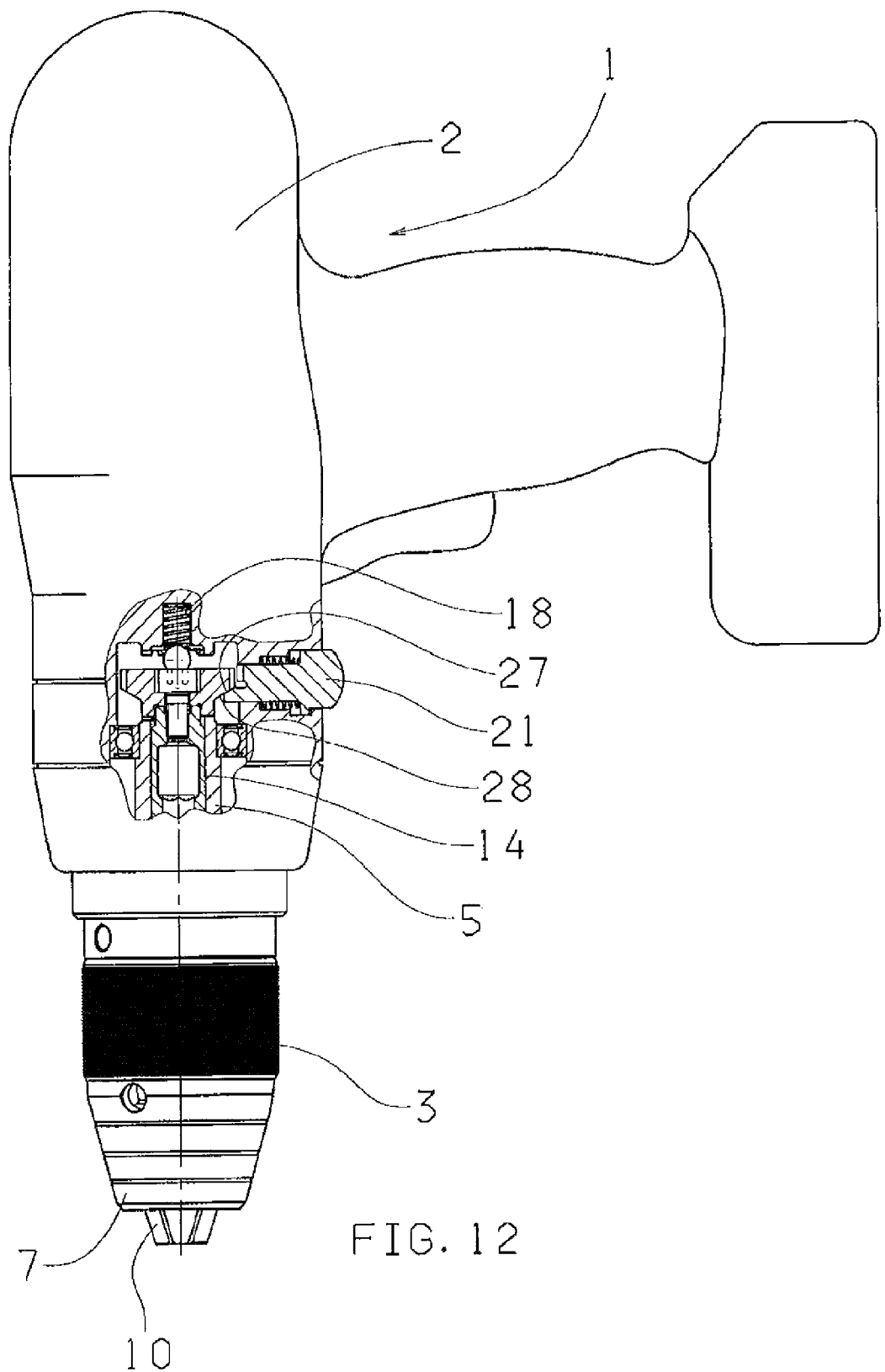
FIG. 12 is a view like FIG. 11, with a push button according to FIG. 7, shown partly in section.

In the drawings, drilling apparatuses 1 are shown comprising a power unit 2 and a drill chuck 3. The power unit 2 has a housing 4 in which a drill spindle 5 is mounted so as to rotate when driven, generally by an electric motor. In this connection, FIGS. 1 to 3 show drilling apparatuses 1 with line-power cords, while drilling apparatuses 1 powered by rechargeable batteries are shown in FIGS. 11 and 12. In the drilling apparatus 1 according to the invention, the drill chuck 1 is configured as a self-tightening flat-jaw drill chuck having a chuck body 6, a frustoconically tapered tightening sleeve 7 that can be rotated coaxial to the chuck body 6, and a jaw holder 8 in which jaws 10 are guided in guides 9 and that is mounted on a driver 11 for radially displacement. This driver 11 threadedly engages with a threaded stem 12 in an internally threaded tube 13 carried on the chuck body 6 and coaxial to the chuck axis. The threaded tube 13 can be of one-piece construction with the chuck body 6 or separate. When the driver 11 is rotated in the threaded tube 13 relative to the chuck body 6, the driver 11 moves axially, thereby displacing the jaws 10 along the guides 9 of the jaw holder 8 at an acute angle to the chuck axis, and thereby also shifting them radially, in order to thereby allow opening and closing of the drill chuck 3, depending on the direction of rotation of the driver 11.

Figure 13:
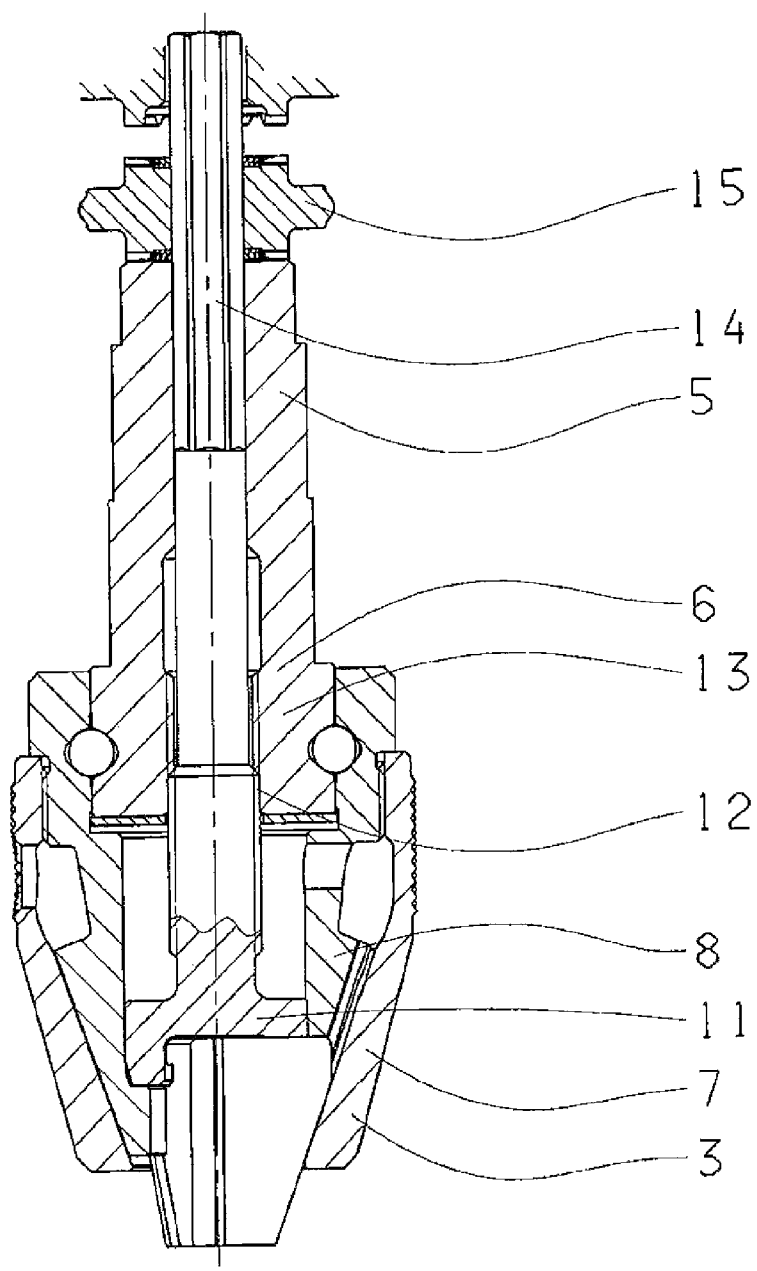
FIG. 13 is a view like FIG. 3 of an embodiment having a threaded tube unitary with the chuck body and directly connected for joint rotation with the coupling rod.

In order to simplify this opening and closing for the user, the motor of the power unit 2 is used. This is done in that the drill spindle 5 is hollow and surrounds a coupling rod 14 that is rotationally coupled to the threaded tube 13 so that the coupling rod 14 can shift between a locked position in which it is coupled with and rotationally arrested by the housing 4 and a drilling position in which it is rotationally fixed to the drill spindle 5. If the coupling rod 14 is in the locked position, rotation of the coupling rod 14 is blocked by the housing 4 as a base, so that rotation of the drill spindle 5 rotates the chuck body 6 with the tightening sleeve 7 and the jaw holder 8, and as a result the driver 11 rotates relative to the threaded tube 12, thereby converting rotation of the drill spindle 5 into movement of the jaws 10 along their guides 9. In the drilling position, the coupling rod 14 is rotationally coupled with the drill spindle 5, so that during drilling, the position of the jaws 10 is fixed in place, and loosening of their clamping effect cannot take place. In the case of a one-piece configuration of the threaded tube 13 with the chuck body 6, the coupling rod 14 is rotationally coupled with the driver 11, (FIG. 13), while otherwise, coupling takes place by way of the separate threaded tube 13.

In order to simplify interaction of the coupling rod 14 with the housing 4, on the one hand, and with the drill spindle 5, on the other hand, a coupling disk 15 is provided on the end of the coupling rod 14 turned away from the threaded tube 13 and disk lies against the housing 4 in the locked position and against the drill spindle 5 in the drilling position. In this connection, the coupling disk 15 has spur-gear teeth 16, on both sides in the illustrated embodiment shown in the drawing for alternate engagement with gear teeth of the housing 4 and of the drill spindle 5, which can furthermore be structured in one piece with the chuck body 5 [6] of the drill chuck 3, in order to simplify the overall structure.

Figure 4:
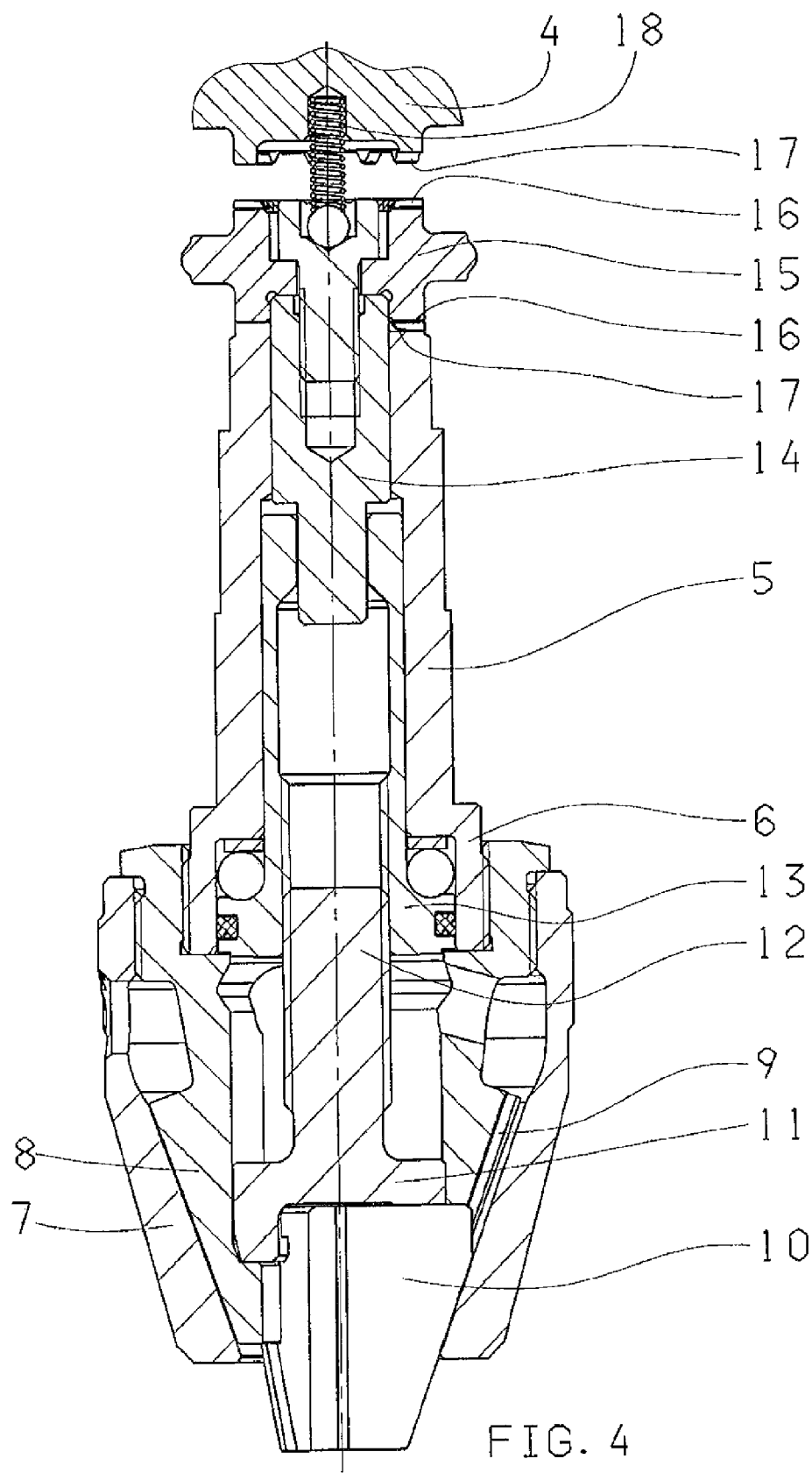
FIG. 4 is a longitudinal section through a detail of a drill chuck with parts of the power unit.
Figure 5:
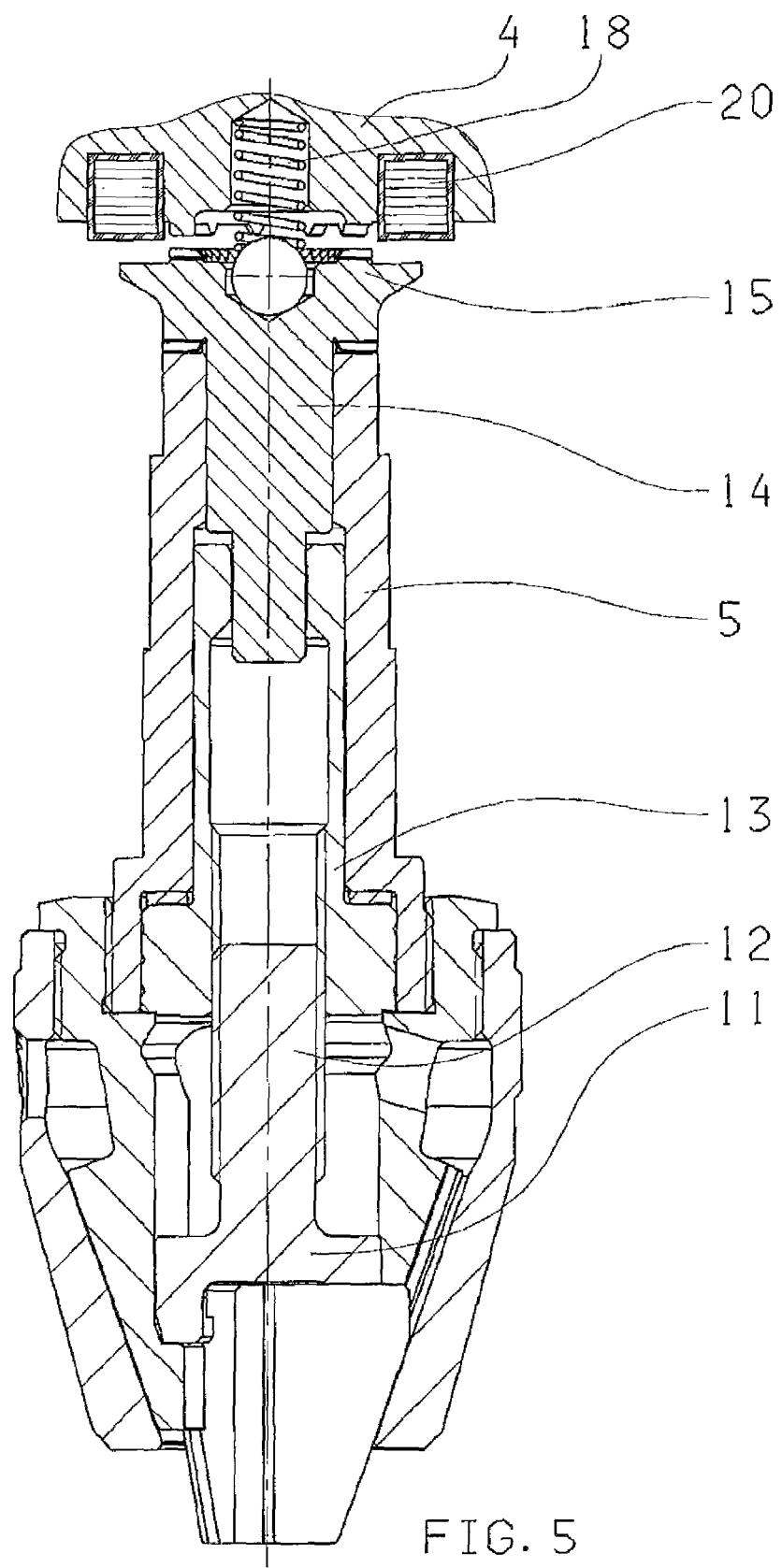
FIG. 5 is a longitudinal section showing interaction of the coupling rod with the housing magnetic forces.

In FIGS. 4 and 5, embodiments are shown in which the coupling rod 14 shifts axially jointly with the coupling disk 15 relative to the threaded tube 13 and the driver 11; here however the required axial shifting for switching between the locked position and the drilling position can also be executed in that only the coupling disk 15 moves on the coupling rod 14 between the locked position and the drilling position. The rotational coupling of the coupling rod 14 to the threaded tube 13 takes place, in the illustrated embodiments shown in the drawings, in that the threaded tube 13 has on its end turned toward the coupling rod 14 a noncircular socket into which the coupling rod 14 engages with an end having a complementary cross-sectional shape, in other words for example the inner end of the coupling rod 14 is of hexagonal section and fits with a complementarily hexagonal-section bore of the threaded tube 13, and thus the coupling rod 14 is surrounded on the outside by the threaded tube 13. Of course, it is also possible for the coupling rod 14 to externally surround the threaded tube 13.

A spring 18 provided between the housing 4 and the coupling rod 14, biases the coupling rod 14 toward the drilling position, and serves to increase safety during drilling.

Transition from this drilling position into the locked position requires displacement of the coupling rod 14 relative to the drilling spindle 5 and relative to the housing 4 under the control of the user of the drilling apparatus 1. For this purpose, an externally operable control element 19 is provided on the housing 4 that, aside from the purely mechanical actuation of the coupling rod 14, can, of course, also act on the drive system at the same time so as to limit the speed of rotation in order to thereby prevent high-speed operation of the drilling apparatus 1 for opening and closing the drill chuck 3.

Figure 6:
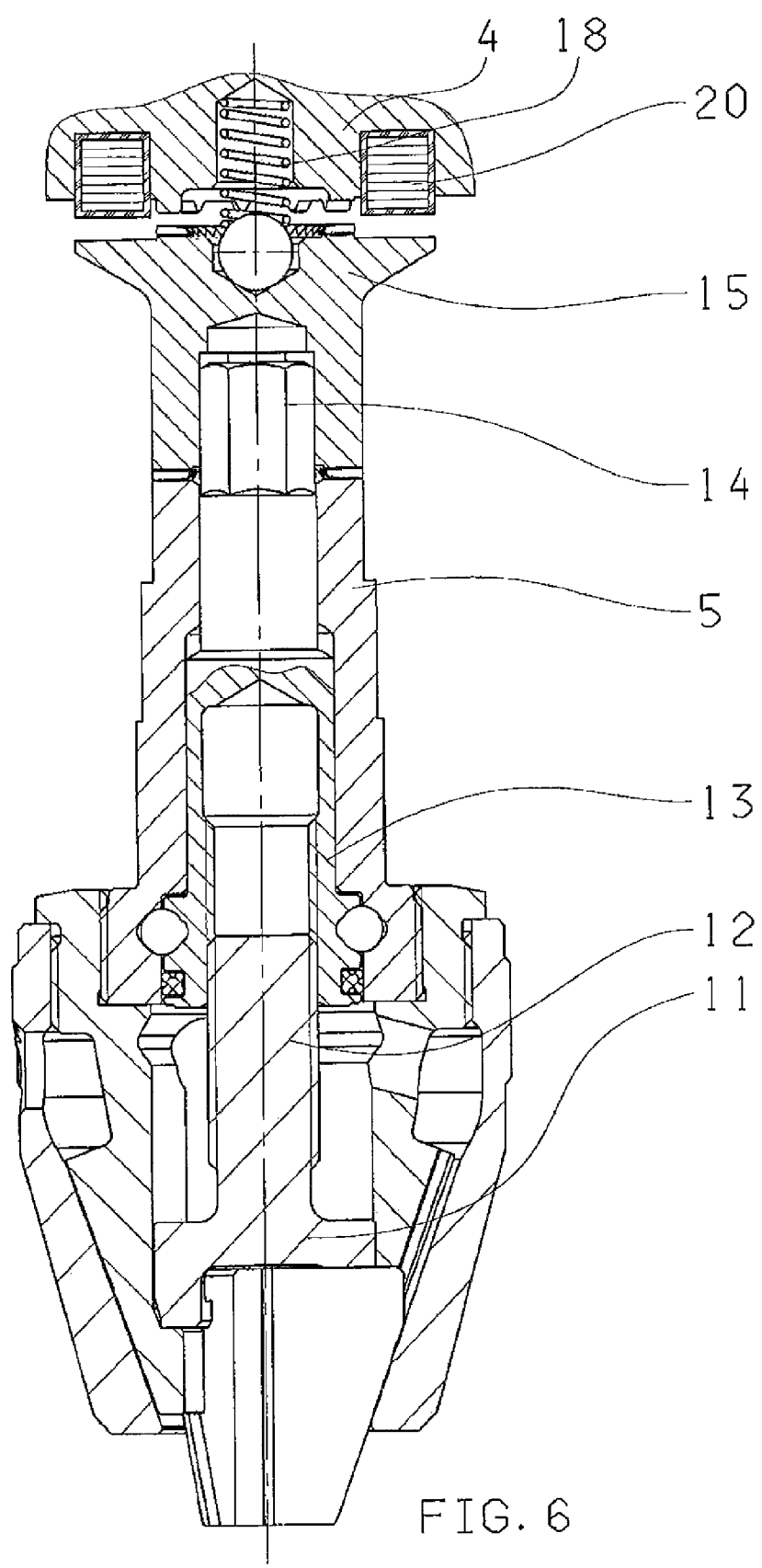
FIG. 6 is a view like FIG. 5 with a coupling disk that is axially displaceable on the coupling rod.

FIGS. 5 and 6 show embodiments in which an electromagnet 20 is provided for shifting the coupling rod 14, the magnet being provided on the housing 4, while the coupling rod 14 is made of a magnetic material. The control element 19 then serves to switch the electromagnet 20 on and off.

Figure 7:
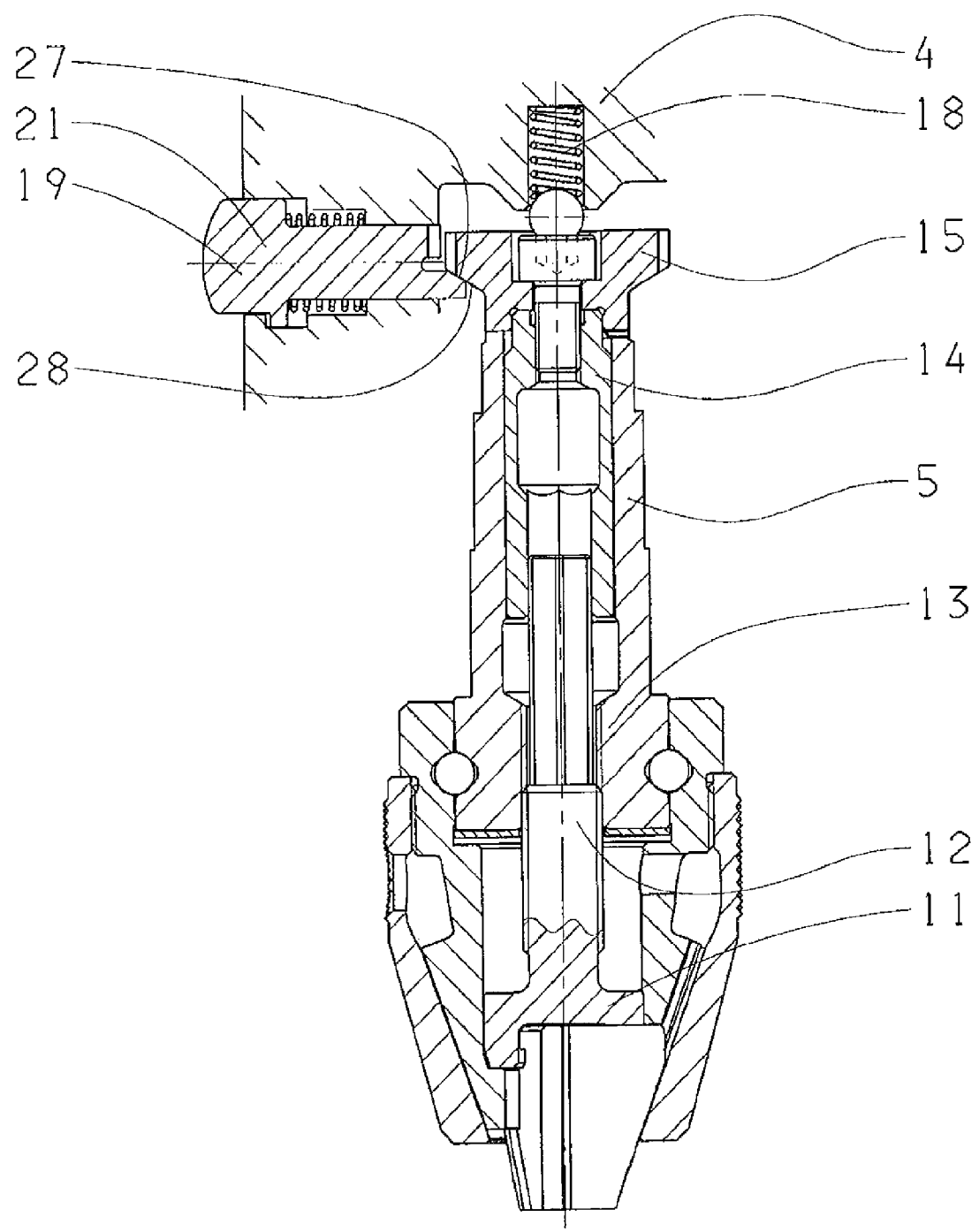
FIG. 7 is a view like FIG. 5 with a push button mounted in the housing for axial movement of the coupling disk.
Figure 8:
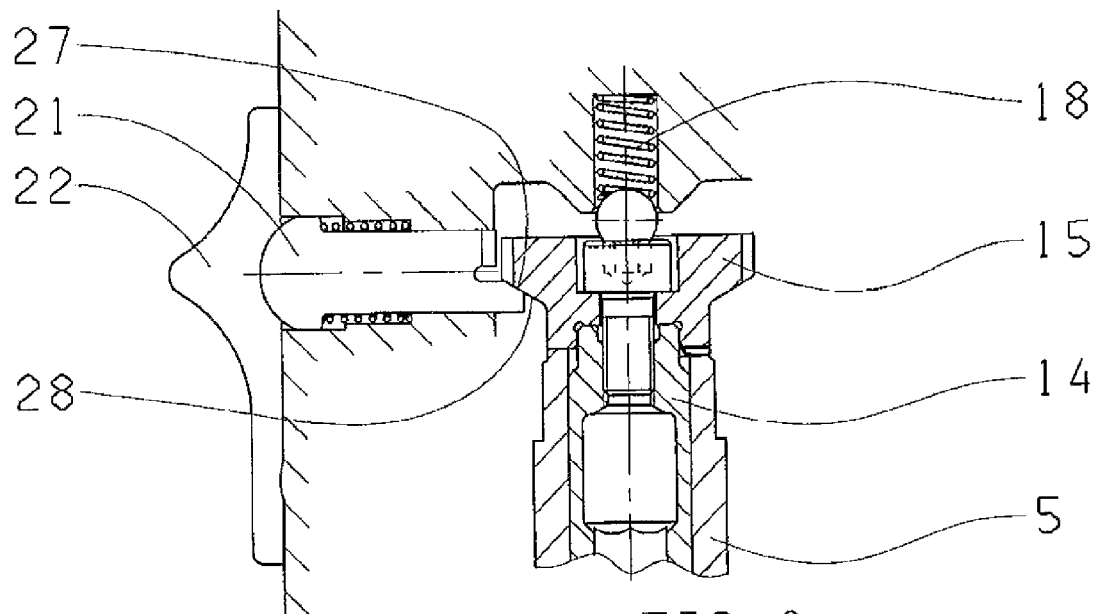
FIG. 8 is a view like FIG. 7 of an alternative embodiment having a slide for operation of the pressure switch.

Alternatively, the possibility shown in FIG. 7 also exists, of a purely mechanical movement of the coupling rod 14, by a control element 19 configured as a push button 21 biased by a spring that urges the push button 21 into a rest position corresponding to the drilling position. In the embodiment shown in FIG. 7, the user can press the push button 21 in and thus shift the coupling rod 14 axially to the rear and into the locked position, thereby driving of the driver 11 with the drill spindle 5. In order to avoid that the user simultaneously actuates the push button 21 and the drill-spindle drive, the possibility exists as shown in FIG. 8 of providing a slide 22 on the push button 21 to maintain it in its position deflected out of the rest position.

Figure 9:
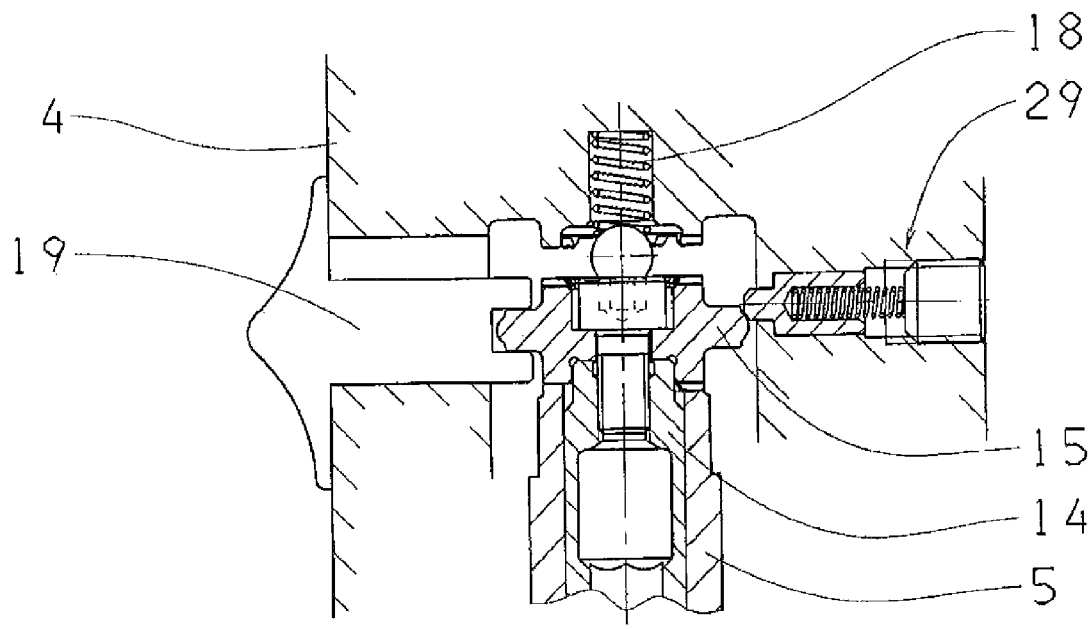
FIG. 9 is a view like FIG. 5 of an alternative switch.

FIG. 9 shows an embodiment in which the control element 19 is a slide that can be shifted between two engagement positions, corresponding to the drilling position and to the locked position.

Figure 10:
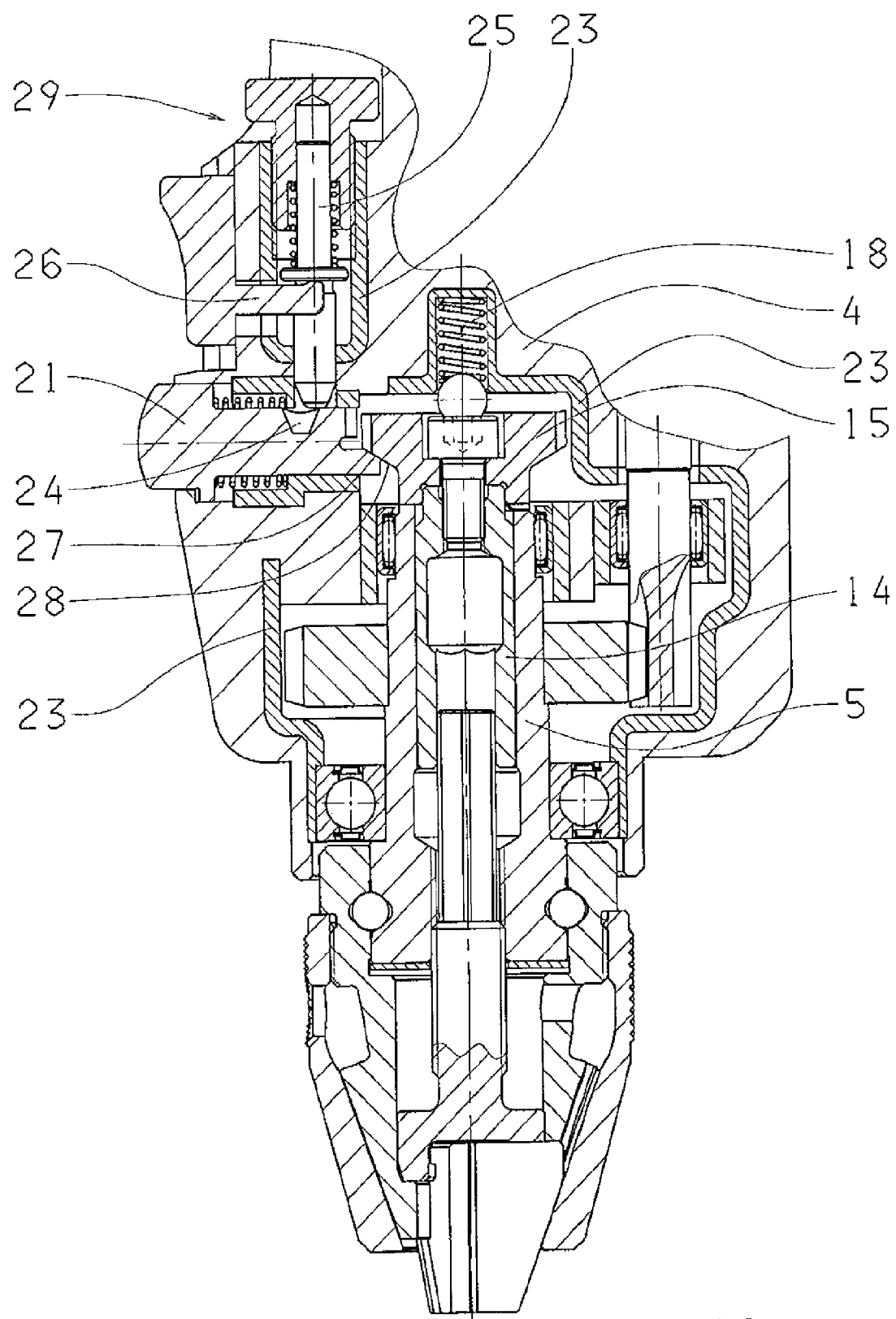
FIG. 10 is a view like FIG. 5 of an embodiment having a stabilizing frame in the housing and an engagement pin with a control pin for the pressure switch.

FIG. 10 shows an embodiment in which a stabilizing frame 23 is provided in the housing 4, in order to be able to take into consideration the greater stresses on the housing 4 that is generally made of plastic, with regard to the operation of the coupling rod 14. This stabilizing frame 23 can consist of a harder plastic or metal. In the illustrated embodiment shown in FIG. 10, an engagement seat 24 is provided on the push button 21, and an engagement pin 25 provided on the housing 4 can be moved by a control pin 26; the engagement pin 25 is urged toward the engagement seat 24 by a control spring having an adjustable bias. In other words, the engagement pin 25 is adjusted by a torque limiter 29 if an adjustable torque is exceeded, and released by the push button 21. The user therefore can here as well first activate the push button 21 and adjust the locked position of the coupling rod 14, and this position is maintained by the interaction of the spring-biased engagement pin 25 with the engagement seat 24 of the push button 21. The user can then initiate rotation of the drill spindle 5 by the drive of the power unit 2, and thus open and close the drill chuck 3. After the jaws 10 have been moved, the control pin 26 is activated and the coupling rod 14 is moved to the drilling position by the spring 18, or the torque limiter 29 responds and brings about this movement.

FIGS. 11 and 12 illustrate a possible integration of the control element 15 or the push button 21 into the housing, near of the rotary selection switch, so that the possibility of one-hand operation exists for the user.

The invention claimed is:

1. A drilling apparatus comprising
    a power unit having a tubular drill spindle rotationally mounted in a housing and centered on an axis;
    a drill chuck having a chuck body provided with a threaded tube coaxial to the spindle;
    a driver having a threaded stem engaging coaxially in the tube of the chuck body;
    a tightening sleeve rotatable coaxially relative to the chuck body;
    a jaw holder formed with guides;
    jaws radially shiftable in the guides and on the driver;
    a coupling rod rotationally connected with and engaged in the threaded tube and movable between a locked position in which the coupling rod is rotationally coupled with the housing and a drilling position rotationally coupled with the drill spindle; and
    a coupling disk on an end of the coupling rod remote from the threaded tube, the disk having a flat face formed with spur-gear teeth engaging against complementary teeth of the housing in the locked position and against the drill spindle in the drilling position.

2. The drilling apparatus according to claim 1, further comprising:
    a spring that urges the coupling rod toward the drilling position between the housing and the coupling rod.

3. The drilling apparatus according to claim 1, wherein an externally accessible control element for adjusting the coupling rod is provided on the housing.

4. The drilling apparatus according to claim 3, wherein a control cam interacts with the coupling rod for movement by a control surface formed on the control element.

5. The drilling apparatus according to claim 3, further comprising:
    a torque limiter for adjusting the control element into a position in which the coupling rod assumes the drilling position when a predetermined torque is exceeded.

6. The drilling apparatus according to claim 5, wherein the predetermined torque can be set.

7. The drilling apparatus according to claim 1, wherein the drill spindle is unitary with the chuck body.

8. The drilling apparatus according to claim 1, wherein the chuck body is made in one piece with the threaded tube such that the screwthread for engaging the threaded stem of the driver is in the chuck body and the coupling rod is rotationally connected with the driver.

9. A drilling apparatus comprising:
    a power unit having a tubular drill spindle rotationally mounted in a housing and centered on an axis;
    a drill chuck having a chuck body provided with a threaded tube coaxial to the spindle;
    a driver having a threaded stem engaging coaxially in the tube of the chuck body;
    a tightening sleeve rotatable coaxially relative to the chuck body;
    a jaw holder formed with guides;
    jaws radially shiftable in the guides and on the driver;
    a coupling rod rotationally connected with and engaged in the threaded tube and movable between a locked position in which the coupling rod is rotationally coupled with the housing and a drilling position rotationally coupled with the drill spindle; and a coupling disk on an end of the coupling rod remote from the threaded tube, the disk engaging against the housing in the locked position and against the drill spindle in the drilling position, the coupling disk being shiftable on the coupling rod between the locked position and the drilling position.

10. A drilling apparatus comprising:
a power unit having a tubular drill spindle rotationally mounted in a housing and centered on an axis;
a drill chuck having a chuck body provided with a threaded tube coaxial to the spindle;
a driver having a threaded stem engaging coaxially in the tube of the chuck body;
a tightening sleeve rotatable coaxially relative to the chuck body;
a jaw holder formed with guides;
jaws radially shiftable in the guides and on the driver;
a coupling rod rotationally connected with and engaged in the threaded tube and movable between a locked position in which the coupling rod is rotationally coupled with the housing and a drilling position rotationally coupled with the drill spindle; and
an externally accessible control element on the housing for adjusting the coupling rod and in the locked position for changing the speed of rotation of the power unit by limiting the speed.

11. A drilling apparatus comprising:
a power unit having a tubular drill spindle rotationally mounted in a housing and centered on an axis;
a drill chuck having a chuck body provided with a threaded tube coaxial to the spindle;
a driver having a threaded stem engaging coaxially in the tube of the chuck body;
a tightening sleeve rotatable coaxially relative to the chuck body;
a jaw holder formed with guides;
jaws radially shiftable in the guides and on the driver;
a coupling rod rotationally connected with and engaged in the threaded tube and movable between a locked position in which the coupling rod is rotationally coupled with the housing and a drilling position rotationally coupled with the drill spindle; and
an externally accessible push button on the housing for adjusting the coupling rod and provided with a spring that urges the push button into a rest position corresponding to the drilling position.

12. The drilling apparatus according to claim 11, further comprising:
a slide connected to the control element for fixing the push button in place in a position out of the rest position.

13. The drilling apparatus according to claim 11, wherein the push button has an engagement seat and the housing has an engagement pin that can be shifted by a control pin.

14. The drilling apparatus according to claim 13, wherein the control pin is urged toward the engagement seat by a control spring.

15. The drilling apparatus according to claim 11, further comprising:
a stabilizing frame in the housing in the region of the coupling disk and of the control element.

16. A drilling apparatus comprising:
a power unit having a tubular drill spindle rotationally mounted in a housing and centered on an axis;
a drill chuck having a chuck body provided with a threaded tube coaxial to the spindle;
a driver having a threaded stem engaging coaxially in the tube of the chuck body;
a tightening sleeve rotatable coaxially relative to the chuck body;
a jaw holder formed with guides;
jaws radially shiftable in the guides and on the driver;
a coupling rod rotationally connected with and engaged in the threaded tube and movable between a locked position in which the coupling rod is rotationally coupled with the housing and a drilling position rotationally coupled with the drill spindle;
an externally accessible control element on the housing for adjusting the coupling rod, the coupling rod being formed from a magnetic material, and
an electromagnet activatable by the control element and in the housing.

17. A drilling apparatus comprising:
a power unit having a tubular drill spindle rotationally mounted in a housing and centered on an axis;
a drill chuck having a chuck body provided with a threaded tube coaxial to the spindle;
a driver having a threaded stem engaging coaxially in the tube of the chuck body;
a tightening sleeve rotatable coaxially relative to the chuck body;
a jaw holder formed with guides;
jaws radially shiftable in the guides and on the driver; and
a coupling rod rotationally connected with and engaged in the threaded tube and movable between a locked position in which the coupling rod is rotationally coupled with the housing and a drilling position rotationally coupled with the drill spindle, the threaded tube having at its end turned toward the coupling rod a non-circular opening into which engages an end of the coupling rod of complementary cross-sectional shape.

\* \* \* \* \*